United States Patent [19]
Sakurai et al.

[11] Patent Number: 5,353,636
[45] Date of Patent: Oct. 11, 1994

[54] DEVICE FOR DETERMINING MISFIRING OF CYLINDERS IN MULTI-CYLINDER ENGINES

[75] Inventors: Kazuhiro Sakurai, Gotenba; Yutaka Obuchi, Susono; Yuji Nishibe, Toki; Yutaka Nonomura, Nagoya; Kouji Tsukada, Seto; Masaharu Takeuchi, Owariasahi; Masanori Miyashita, Aichi, all of Japan

[73] Assignees: Toyota Jidosha Kabushiki Kaisha, Tokyo; Kabushiki Kaisha Toyota Chuo Kenkyusho, Aichi, both of Japan

[21] Appl. No.: 95,620

[22] Filed: Jul. 21, 1993

[30] Foreign Application Priority Data

Aug. 7, 1992 [JP] Japan .................. 4-211595

[51] Int. Cl.$^5$ .......................... G01M 15/00
[52] U.S. Cl. .................................. 73/117.3
[58] Field of Search ............... 73/116, 117.3; 364/431.07, 431.04, 431.08; 123/419, 423, 425, 676, 436

[56] References Cited

U.S. PATENT DOCUMENTS 5,200,899  4/1993  Ribbens et al. ............ 364/431.03

FOREIGN PATENT DOCUMENTS 58-106524  7/1983  Japan .
60-8429    1/1985  Japan .
60-141442  9/1985  Japan .

*Primary Examiner*—Robert Raevis
*Attorney, Agent, or Firm*—Kenyon & Kenyon

[57] ABSTRACT

A torque sensor which can detect instantaneous output torque of the engine is disposed on the output shaft of the engine, and the output signal thereof is frequency-analyzed to extract a half synchronous frequency component having a frequency equals to a half of the number of the revolutions of the engine per second and a synchronous frequency component having a frequency equals to the number of the revolutions of the engine per second, the electronic control unit (ECU) of the engine determines the misfiring mode of the engine including the number of the misfiring cylinders and the interval thereof in the firing order of the engine based on the amplitude of the frequency components and the waveform thereof, then the ECU determines the misfiring cylinders based on the determined misfiring mode and the phase angle of the frequency components of the torque sensor relative to a reference crank angle signal.

7 Claims, 14 Drawing Sheets

| MODE | | HALF SYNCHRONOUS ($L_{1/2}$) | SYNCHRONOUS ($L_1$) |
|---|---|---|---|
| NORMAL | | SMALL (≒0) | SMALL |
| MISFIRING (ONE CYLINDER) | | LARGER THAN NORMAL | LARGER THAN NORMAL |
| MISFIRING (TWO CYLINDERS) | A. | LARGER THAN NORMAL | LARGER THAN NORMAL |
| | B. | LARGER THAN NORMAL | SMALL |
| | C. | LARGER THAN NORMAL | LARGER THAN NORMAL |
| | D. | SMALL (≒0) | LARGER THAN NORMAL |

Fig. 5

| MODE | | HALF SYNCHRONOUS ($L_{1/2}$) | SYNCHRONOUS ($L_1$) |
|---|---|---|---|
| NORMAL (FIG. 2) | | SMALL ($\approx 0$) | SMALL |
| MISFIRING (ONE CYLINDER) (FIG. 3) | | LARGER THAN NORMAL | LARGER THAN NORMAL |
| MISFIRING (TWO CYLINDERS) | A. (FIG. 4A) | LARGER THAN NORMAL | LARGER THAN NORMAL |
| | B. (FIG. 4B) | LARGER THAN NORMAL | SMALL |
| | C. (FIG. 4C) | LARGER THAN NORMAL | LARGER THAN NORMAL |
| | D. (FIG. 4D) | SMALL ($\approx 0$) | LARGER THAN NORMAL |

MISFIRING IN ONE CYLINDER

MISFIRING IN TWO ADJACENT CYLINDERS IN THE FIRING ORDER

MISFIRING IN TWO CYLINDERS SEPARATED BY TWO CYLINDERS IN THE FIRING ORDER

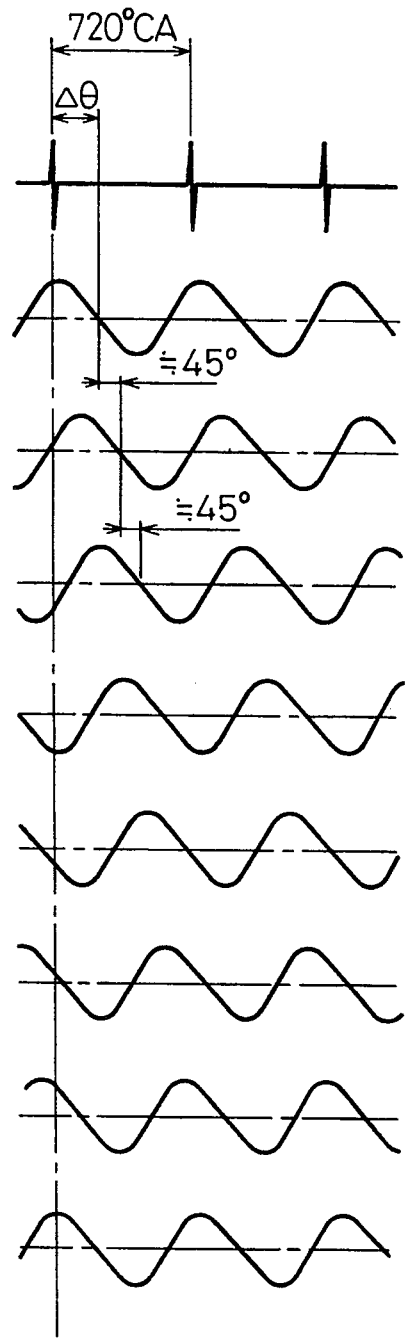
REFERENCE CRANK ANGLE SIGNAL
Fig.7A CYLINDER #1
Fig.7B CYLINDER #8
Fig.7C CYLINDER #4
Fig.7D CYLINDER #3
Fig.7E CYLINDER #6
Fig.7F CYLINDER #5
Fig.7G CYLINDER #7
Fig.7H CYLINDER #2

REFERENCE CRANK ANGLE SIGNAL 
Fig. 8A CYLINDERS #1, #8 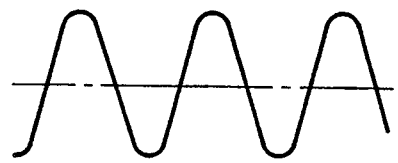
Fig. 8B CYLINDERS #8, #4 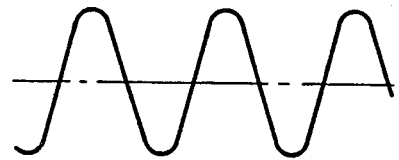
Fig. 8C CYLINDERS #4, #3 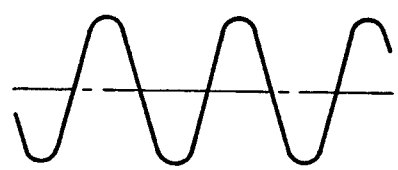
Fig. 8D CYLINDERS #3, #6 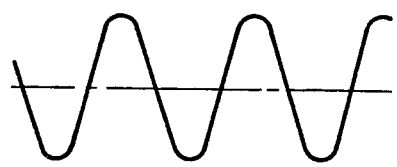
Fig. 8E CYLINDERS #6, #5 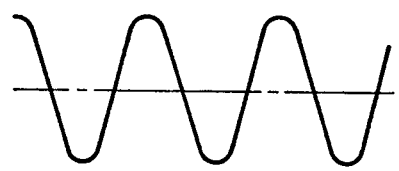
Fig. 8F CYLINDERS #5, #7 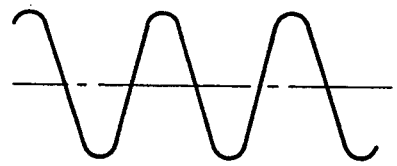
Fig. 8G CYLINDERS #7, #2 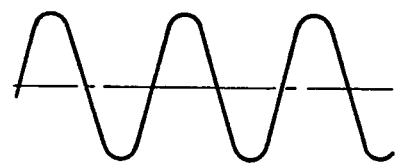
Fig. 8H CYLINDERS #2, #1 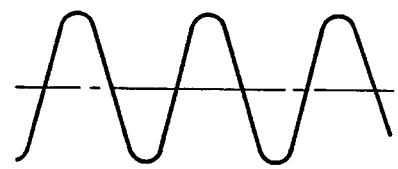

REFERENCE CRANK ANGLE SIGNAL
Fig. 9A  CYLINDERS #1, #4
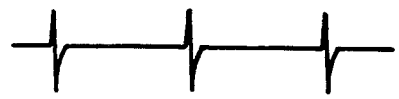
Fig. 9B  CYLINDERS #8, #3
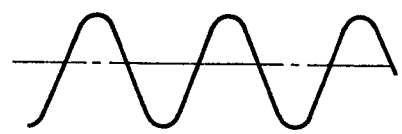
Fig. 9C  CYLINDERS #4, #6
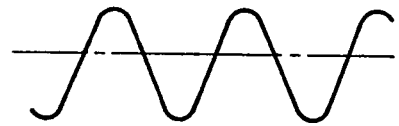
Fig. 9D  CYLINDERS #3, #5
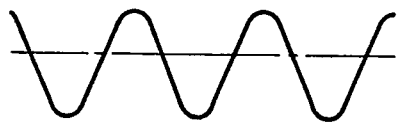
Fig. 9E  CYLINDERS #6, #7
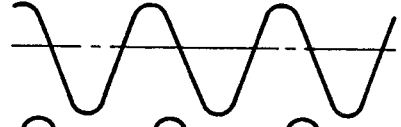
Fig. 9F  CYLINDERS #5, #2
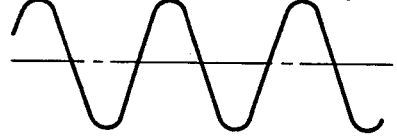
Fig. 9G  CYLINDERS #7, #1
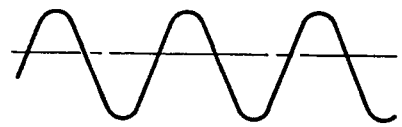
Fig. 9H  CYLINDERS #2, #8
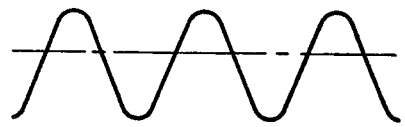

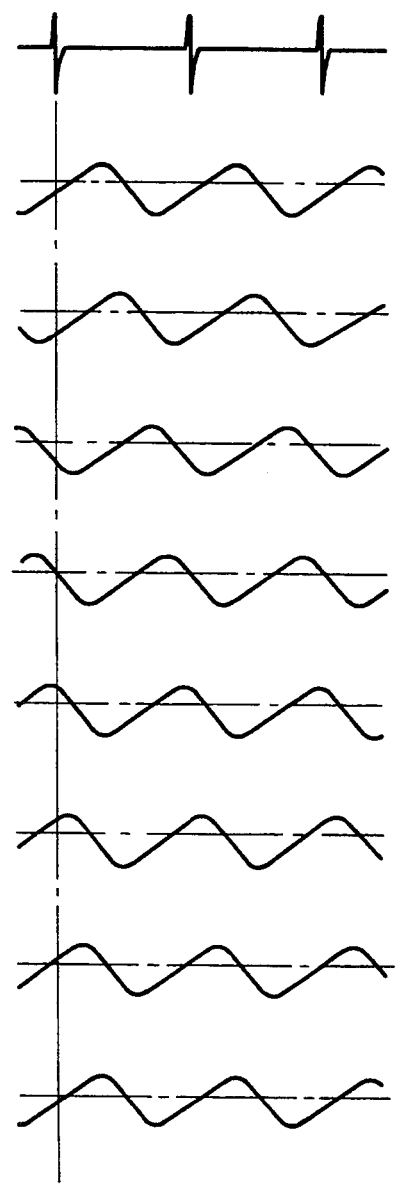
REFERENCE CRANK ANGLE SIGNAL
Fig.10A CYLINDERS #1, #3
Fig.10B CYLINDERS #8, #6
Fig.10C CYLINDERS #4, #5
Fig.10D CYLINDERS #3, #7
Fig.10E CYLINDERS #6, #2
Fig.10F CYLINDERS #5, #1
Fig.10G CYLINDERS #7, #8
Fig.10H CYLINDERS #2, #4

REFERENCE CRANK ANGLE SIGNAL 
Fig.11A CYLINDERS #1, #6 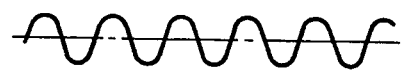
Fig.11B CYLINDERS #8, #5 
Fig.11C CYLINDERS #4, #7 
Fig.11D CYLINDERS #3, #2 

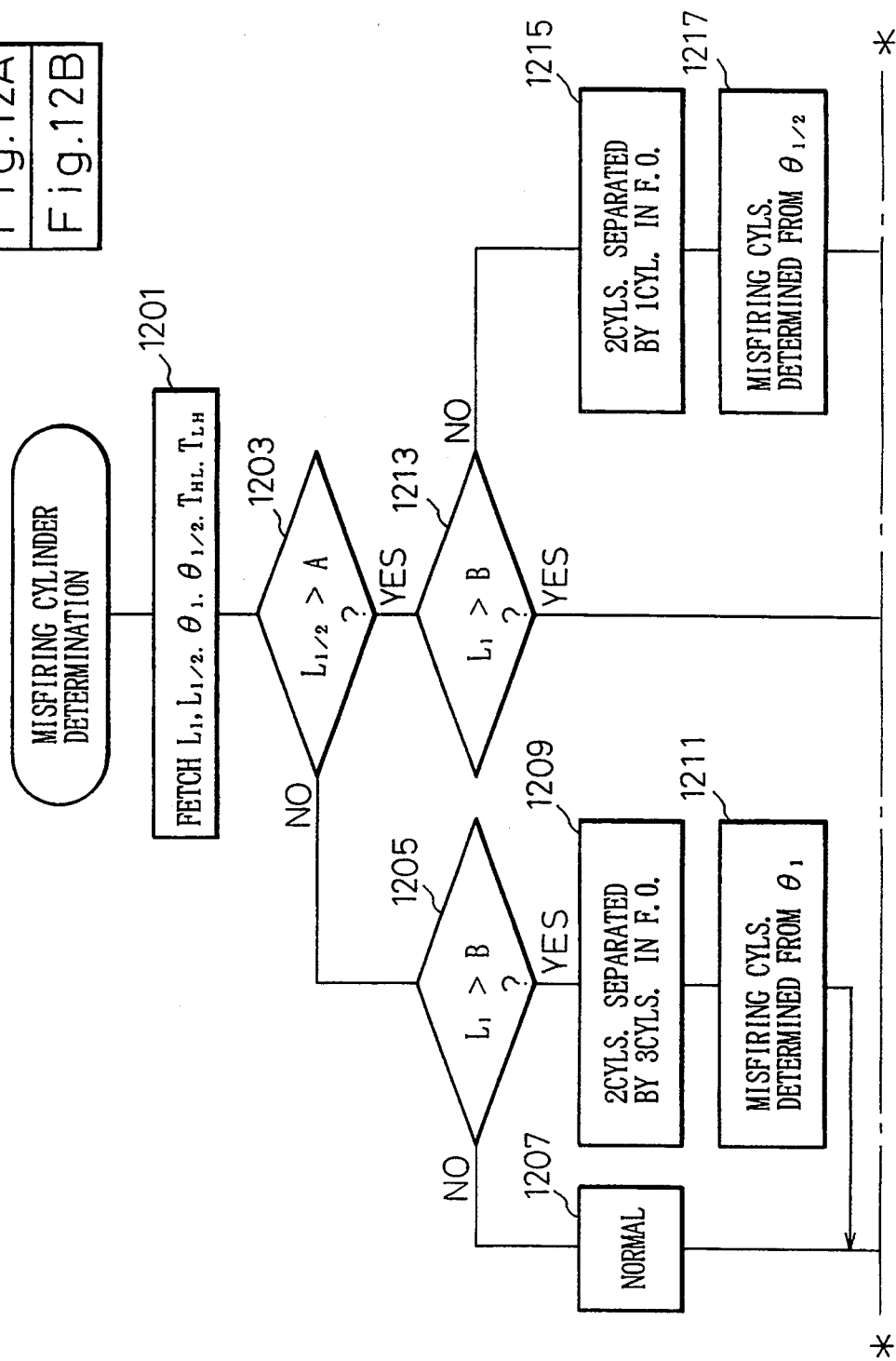

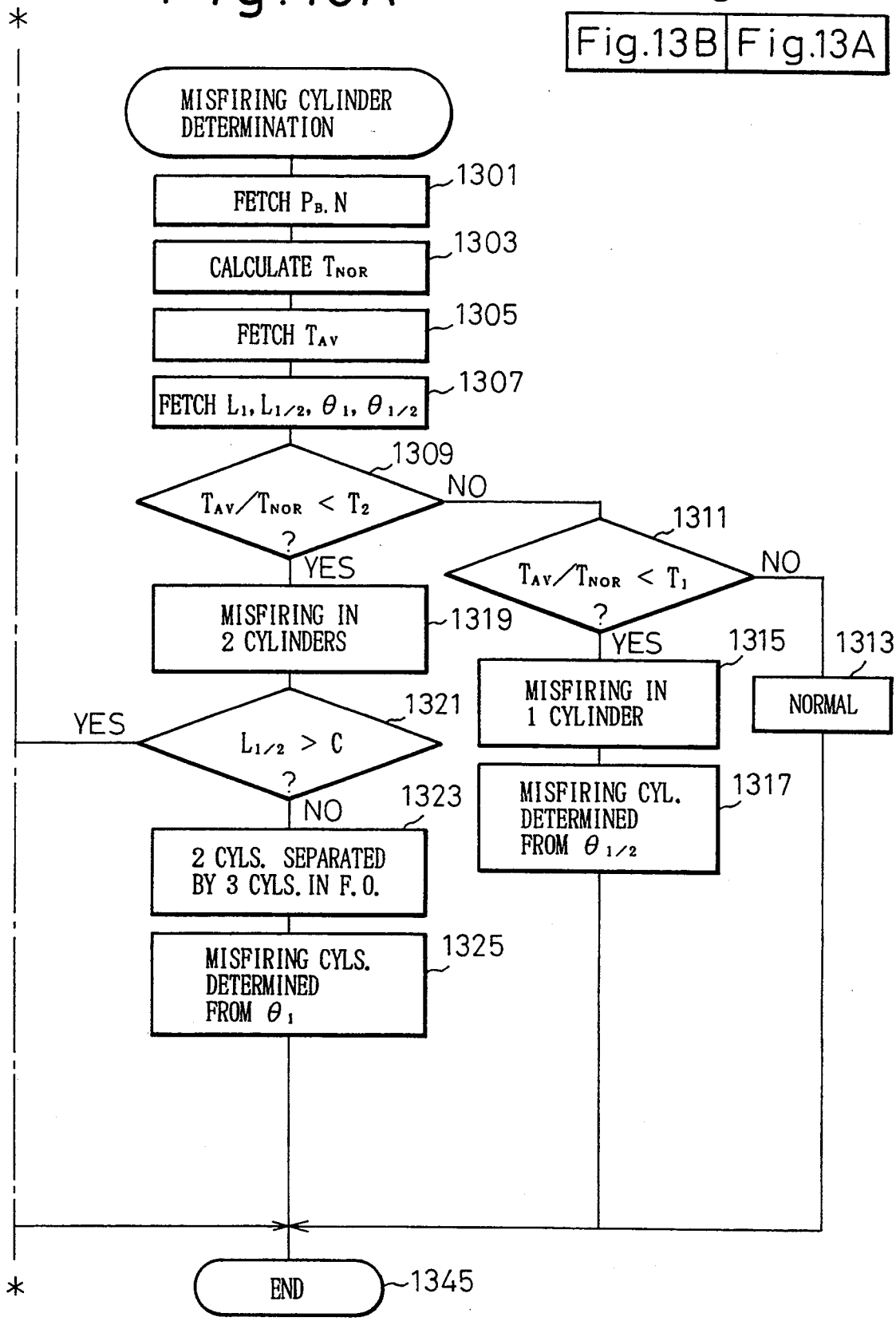

DEVICE FOR DETERMINING MISFIRING OF CYLINDERS IN MULTI-CYLINDER ENGINES

BACKGROUND OF THE INVENTION

1. Field of the Invention

The present invention relates to a device for determining misfiring in cylinders of a multi-cylinder engine.

2. Description of the Related Art

In a multi-cylinder engine, misfiring cylinders can be determined accurately by detecting the combustion pressure or exhaust gas temperature of each cylinder of the engine. However, to detect misfiring cylinders by this method, it is necessary to install a combustion pressure sensor or exhaust gas temperature sensor on each cylinder of the engine. Since many sensors are involved, the initial cost of the device becomes higher, and the reliability of the device becomes lower due to the possibility of failure of the sensors. Therefore, in prior arts, an effort is directed to provide a device for determining misfiring cylinders in a multi-cylinder engine which is reliable and less expensive, by reducing the number of the sensors involved.

For example, Japanese Unexamined Utility Model Publication (Kokai) No. 60-8429 discloses a device for determining misfiring cylinders in a multi-cylinder engine based on the difference in the torsional vibration of the output shaft of the engine peculiar to combinations of the misfiring cylinders. This device comprises a torsional pulse generator which generates pulse signals representing a rotational angle of the output shaft at a predetermined longitudinal position thereof, and a reference pulse generator which generates a pulse signal every time the piston of a predetermined cylinder reaches the top dead center, and a rotation pulse generator which generates a predetermined number of pulse signals dividing the period between said reference pulse signals at regular intervals. The device measures the time lag between the torsional pulse and the rotation pulse. The amount of this time lag corresponds to instantaneous torsional angle of the output shaft of the engine i.e., the instantaneous amplitude of the torsional vibration of the output shaft. Then this time lag signal is frequency-analyzed and a spectrum thereof is obtained. The spectrum pattern obtained is then compared with the patterns previously obtained by cutting the fuel supply to the various cylinders of the engine, and the misfiring cylinders are determined based on the similarities of the patterns.

By the device described above, the misfiring cylinders can be determined without using the combustion pressure sensors nor the exhaust gas temperature sensors. However, in the above device, there is a problem that the accuracy of the determination of the misfiring cylinders is relatively low. Since the device utilizes the time lag between the torsional pulse and the rotation pulse to determine the misfiring cylinders and this time lag is affected not only by the misfiring of the cylinders but also by the fluctuation of the engine rotational speed, the spectrum pattern obtained is also affected by the fluctuation of the engine rotational speed. Accordingly, the accuracy of the determination itself is also affected by the fluctuation of the engine rotational speed.

SUMMARY OF THE INVENTION

Therefore, in view of the problems of the related art, the object of the present invention is to provide a device for determining the misfiring cylinders in the multi-cylinder engine which does not use the combustion pressure sensors nor the exhaust gas temperature sensors while maintaining high accuracy of the determination.

According to the present invention, there is provided a device for determining misfiring cylinders in a multi-cylinder engine, comprising a torque sensing means for detecting an output torque of the engine and generating an output signal representing the output torque of the engine; a frequency analyzing means for extracting specific frequency components from the output signal of said torque sensing means; a misfiring mode determining means for determining a mode of the misfiring of the engine including number of the misfiring cylinders and the intervals thereof in the firing order based on at least amplitude of said specific frequency components of the output signal of said torque sensing means; and a misfiring cylinder determining means for determining the misfiring cylinders based on said misfiring mode and said specific frequency components of the output signal of said torque sensing means.

BRIEF DESCRIPTION OF THE DRAWINGS

The present invention will be better understood from the description as set froth hereinafter, with reference to the accompanying drawings, in which:

FIG. 5 shows the relationships of the magnitudes of the amplitude of the half synchronous frequency components and the synchronous frequency components appearing in the diagrams in FIGS. 2, 3, and 4A through 4D.

FIGS. 7A through 7H schematically show the waveforms of the half synchronous frequency component of the output signal of the torque sensor when the misfiring occurs in one cylinder of the engine;

FIGS. 8A through 8H schematically show the waveforms of the half synchronous frequency component of the output signal of the torque sensor when the misfiring occur in two adjacent cylinders in the firing order;

FIGS. 9A through 9H schematically show the waveforms of the half synchronous frequency component of the output signal of the torque sensor when the misfiring occur in two cylinders separated by one cylinder in the firing order;

FIGS. 10A through 10H schematically show the waveforms of the half synchronous frequency component of the output signal of the torque sensor when the misfiring occur in two cylinders separated by two cylinders in the firing order;

FIGS. 11A through 11D schematically show the waveforms of the synchronous frequency component of the output signal of the torque sensor when the misfiring occur in two cylinders separated by three cylinders in the firing order;

FIGS. 12, 12A and 12B are a flow chart showing an embodiment of the operation for determining misfiring cylinders;

FIGS. 13, 13A and 13B are a flow chart showing another embodiment of the operation for determining misfiring cylinders.

DESCRIPTION OF THE PREFERRED EMBODIMENT

Figure 1:
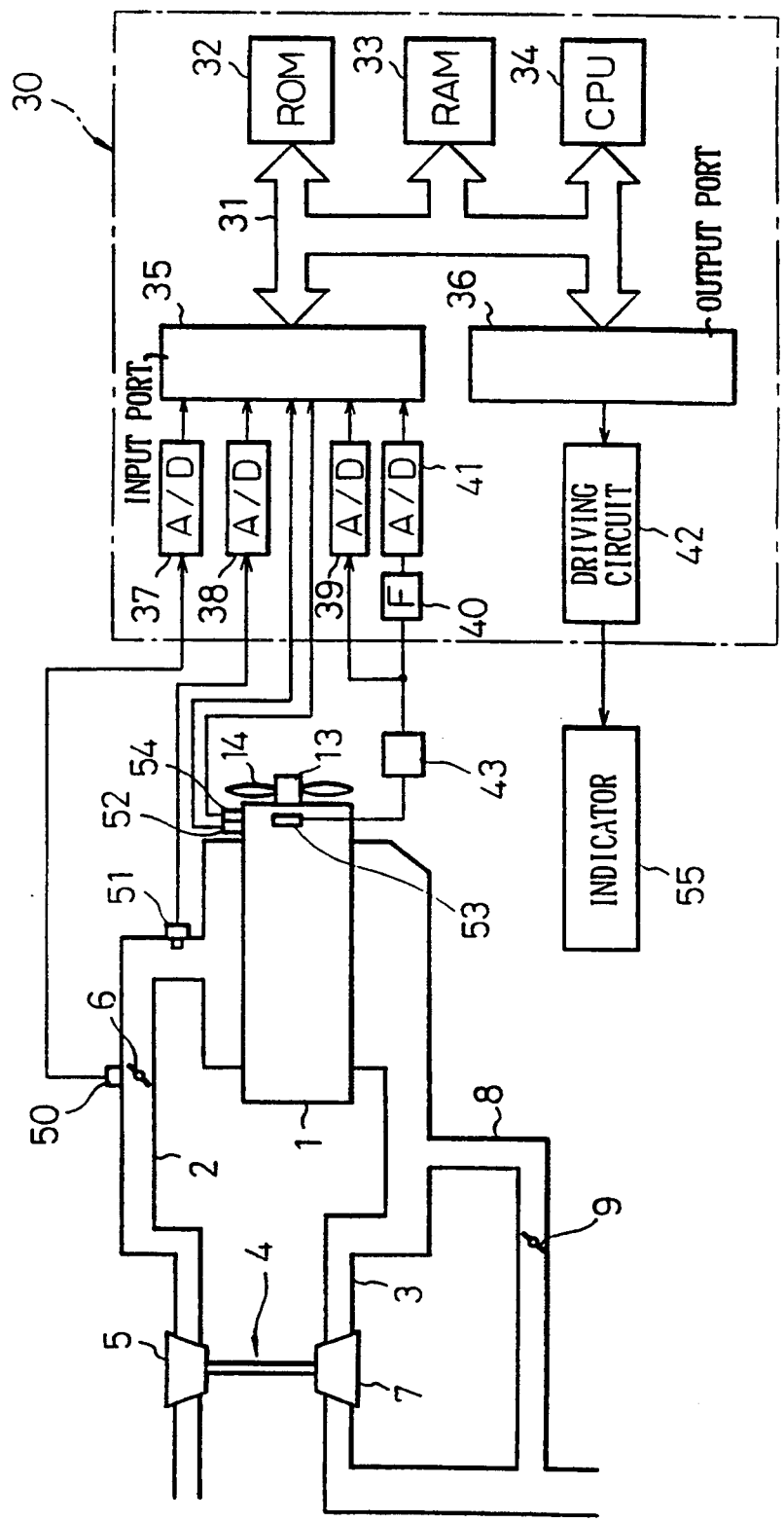
FIG. 1 is a schematic view of a multi-cylinder internal combustion engine showing an embodiment of the present invention.

FIG. 1 schematically illustrates an embodiment of the device for determining the misfiring cylinders in the multi-cylinder engine according to the present invention.

In FIG. 1, reference numeral 1 represents a four-cycle internal combustion engine having eight cylinders.

The firing order of the cylinders of the engine 1 in this embodiment is #1-#8-#4-#3-#6-#5-#7-#2. In this embodiment, the engine 1 is used for an aircraft, and a propeller 14 is connected to an output shaft 13 of the engine 1.

Numerals 2 and 3 designate an inlet air passage and an exhaust gas passage of the engine 1 respectively. 4 is a turbocharger for pressurizing inlet air of the engine comprising a compressor 5 and an exhaust turbine 7. In the inlet air passage 2 downstream of the compressor 5, a throttle valve 6 is disposed. Numeral 8 designates an exhaust bypass passage connecting the portions of the exhaust gas passage 3 upstream and downstream of the exhaust turbine 7. In the bypass passage 8, a waste gate valve 9 is provided to prevent excessive pressure rise of the inlet air by controlling the amount of exhaust gas flowing through the bypass passage 8.

The electronic control unit (ECU) 30, which may be constructed by a microcomputer, comprising a central processing unit (CPU) 34, a read-only-memory (ROM) 32, a random-access-memory (RAM) 33, an input port 35, and an output port 36, all mutually connected through two-way bus 31. In the RAM 33, temporary data used for processing the routines are stored. In the ROM 32, routines for controlling the engine 1, for example, a main routine and interrupt routines such as a fuel injection routine, an ignition timing routine, as well as a routine for determining misfiring cylinders explained later and the constants used in the routines are stored.

A throttle sensor 50 which generates a voltage signal corresponding to a degree of opening of the throttle valve 6 is provided in the vicinity of the throttle valve 6 and the output signal thereof is fed to the input port 35 of ECU 30 via an analog-to-digital (A/D) converter 37. A boost pressure sensor 51 which generates a voltage signal proportional to the inlet air pressure of the engine 1 is provided on the inlet air passage 2 downstream of the throttle valve 6, and the output signal thereof is fed to the input port 35 via an A/D converter 38.

Crank angle sensors 52 and 54, for detecting the rotational angle of the crankshaft (not shown) of the engine 1 are disposed, for example, at a distributor of the engine 1.

In this embodiment, the crank angle sensor 52 generates a pulse signal at every 30° crank angle (CA) and the crank angle sensor 54 generates a pulse signal at every 720° CA. The pulse signals from the crank angle sensors 52 and 54 are supplied to the input port 35 of the ECU 30. The engine rotational speed is calculated from the pulse signal of the crank angle sensor 52, and the pulse signal from the crank angle sensor 54 is used as a reference signal for crank angle.

Numeral 53 in FIG. 1 designates a torque sensor disposed on the crankshaft of the engine 1 for detecting an output torque of the engine 1. The torque sensor 53 is of a type which can generate an analog signal representing an instantaneous output torque of the engine 1, and in this embodiment, a magnetostrictive torque sensor of known type which detects the torque transmitted by crankshaft directly based on the change in the permeability of the shaft is used as the torque sensor 53.

The output signal of the torque sensor 53 which represents the instantaneous output torque of the engine 1 is fed to the input port 35 of the ECU 30 via an A/D converter 39. Also, the output signal of the torque sensor 53 is fed to the input port 35 of the ECU 30 via a signal processing circuit 43 and an adaptive filter 40. The adaptive filter 40 is a filter in which the passband changes in accordance with the rotational speed of the engine 1. In this embodiment, the filter 40 has two adaptive pass band, i.e., a frequency equals to the number of the revolutions of the engine per second (hereinafter, called "a synchronous frequency"), and a frequency equals to a half the number of the revolutions of the engine per second (hereinafter, called "a half synchronous frequency"). The torque sensor 53 may be disposed on the input shaft of a transmission (if any) connected to the crankshaft instead of the crankshaft itself.

Numeral 55 designates a misfiring indicator which is connected to the output port 36 of the ECU 30 via an appropriate driving circuit 42. The misfiring indicator 55 indicates the cylinder numbers of the misfiring cylinders according to the output signal from the ECU 30 when misfiring occurs in the engine.

The procedure for determining misfiring cylinders used in this embodiment is now explained.

Since the misfiring in more than three cylinders seldom occurs in practical view point, and even if it occurs, the pilot can easily "feel" the misfiring, misfiring in two cylinders and in one cylinder only are treated in this embodiment.

Figure 2:
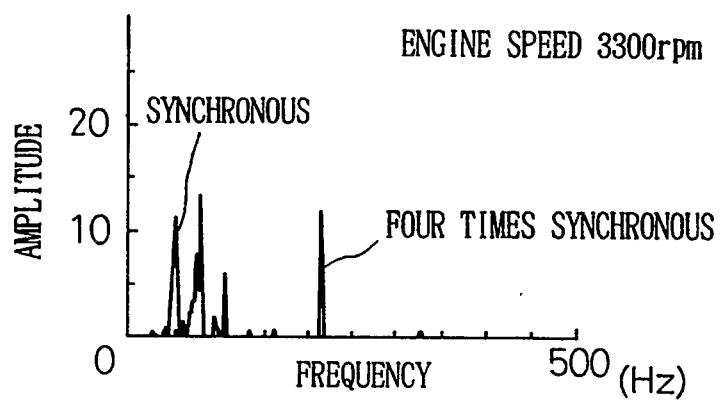
FIG. 2 is an example of the frequency spectrum diagram of the output signal of the torque sensor when no misfiring occurs in the cylinders.

FIG. 2 illustrates a frequency spectrum diagram of the output signal of the torque sensor 53 when the engine 1 is operated in the normal condition, i.e., no misfiring occurs. As shown in FIG. 2, frequency components having synchronous and four times synchronous (frequency equals to four times of the number of the revolutions of the engine 1 per second) which characterize four cycle eight cylinder engines are dominant.

Figure 3:
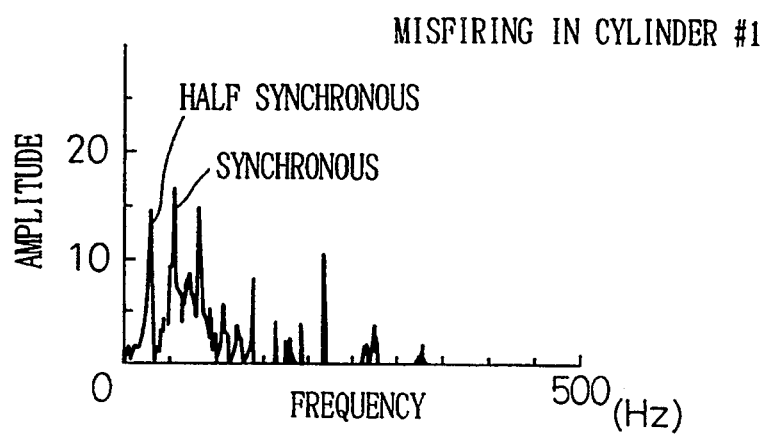
FIG. 3 is an example of the frequency spectrum diagram of the output signal of the torque sensor when the misfiring occurs in one cylinders of the engine.

On the other hand, FIG. 3 illustrates a frequency spectrum diagram of the output signal of the torque sensor 53 when misfiring occurs in one cylinder of the engine 1, e.g., in cylinder #1. When misfiring occurs in one cylinder, misfiring occurs once per two revolutions of the engine, accordingly the half synchronous frequency component clearly appears in the spectrum diagram.

Figure 4A:
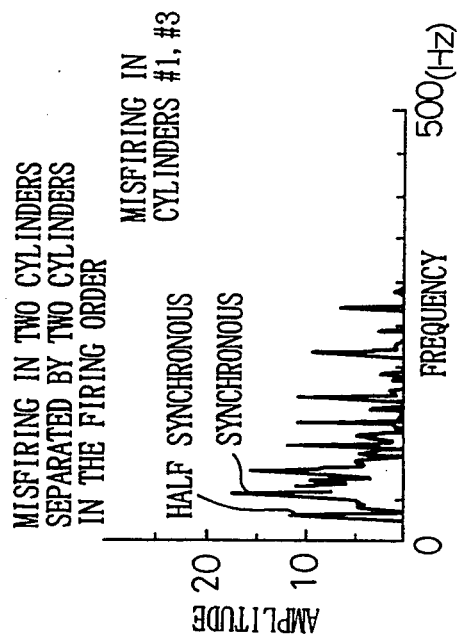
FIGS. 4A through 4D are examples of the frequency spectrum diagram of the output signal of the torque sensor when the misfiring occur in two cylinders of the engine.
Figure 4C:
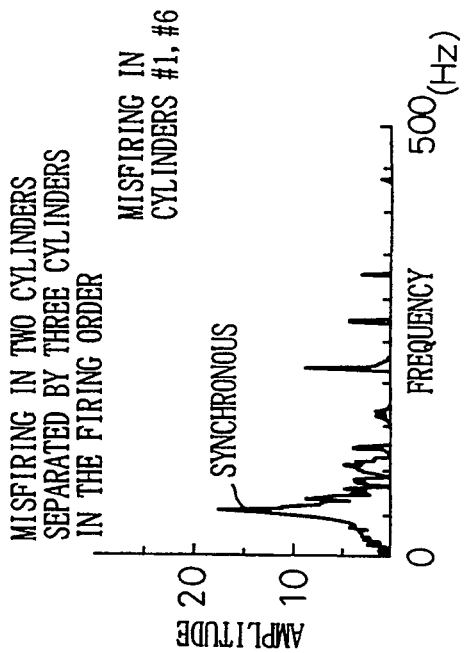
Figure 4B:
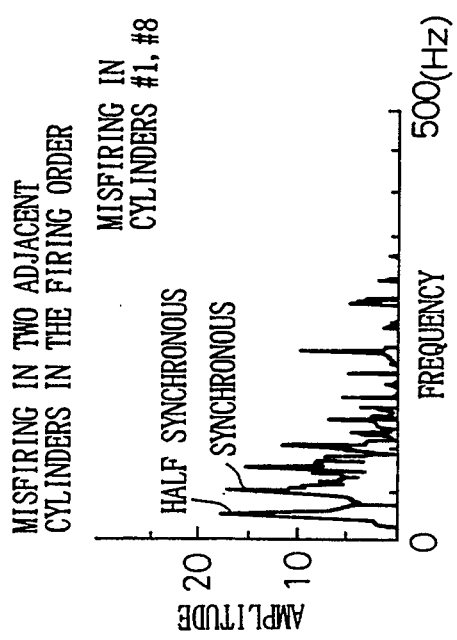
Figure 4D:
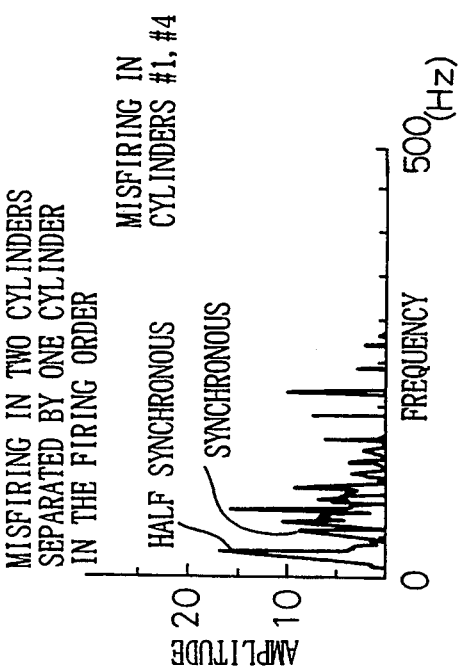

Further, FIGS. 4A through AD illustrate frequency spectrum diagrams of the output signal of the torque sensor 53 when misfiring occurs in two cylinders. In this case, there are four combinations of misfiring cylinders, i.e., misfiring occurs in;

a) two adjacent cylinders in the firing order (e.g., #1 and #8 cylinder: FIG. 4A),
b) two cylinders separated by one cylinder in the firing order (e.g., cylinders #1 and #4: FIG. 4B),
c) two cylinders separated by two cylinders in the firing order (e.g., cylinders #1 and #3: FIG. 4C),
d) two cylinders separated by three cylinders in the firing order (e.g., cylinders #1 and #6: FIG. 4D).

As seen from these diagrams, the number of misfiring cylinders (0, 1, 2) and interval thereof in the firing order (hereinafter called "mode of misfiring" or "misfiring mode") can be determined by the amplitude of the half synchronous and the synchronous frequency components in the spectrum diagrams.

The table shown in FIG. 5 summarizes the change in the relationships of the magnitudes of the amplitude of the half synchronous frequency components and the synchronous frequency components appearing in the diagrams in FIGS. 2, 3, and 4A through 4D.

Namely:
①  When the engine is operated in normal condition (i.e., no misfiring occurs;
   a) the magnitude of the half synchronous frequency component ($L_{\frac{1}{2}}$) is substantially zero,
   b) the magnitude of the synchronous frequency component ($L_1$) is small.
②  When misfiring occurs in one cylinder;
   a) $L_{\frac{1}{2}}$ is larger than normal (i.e., the case ①a)),
   b) $L_1$ is larger than normal (i.e., the case ①b)).
③  When misfiring occurs in two adjacent cylinders in the firing order;
   a) $L_{\frac{1}{2}}$ is larger than normal,
   b) $L_1$ is larger than normal.
④  When misfiring occurs in two cylinders separated by one cylinder in the firing order;
   a) $L_{\frac{1}{2}}$ is larger than normal,
   b) $L_1$ is substantially the same as normal.
⑤  When misfiring occurs in two cylinders separated by two cylinders in the firing order;
   a) $L_{\frac{1}{2}}$ is larger than normal,
   b) $L_1$ is larger than normal.
⑥  When misfiring occurs in two cylinders separated by three cylinders in the firing order;
   a) $L_{\frac{1}{2}}$ is substantially the same as normal,
   b) $L_1$ is larger than normal.

Based on the relationships of the magnitude of the amplitude shown in FIG. 5, the misfiring mode of the engine (above ①-⑥) can be determined by following procedure.

(1) When either of the amplitude of the half synchronous frequency component or the synchronous frequency component is large, it can be determined that misfiring occurs in a cylinder (or cylinders) of the engine (above ②-⑥).

(2) When the amplitude of the half synchronous frequency component is large and the amplitude of the synchronous frequency component is small, it can be determined that misfiring occurs in two cylinders separated by one cylinder in the firing order (above 4).

(3) When the amplitude of the half synchronous frequency component is small and the amplitude of the synchronous frequency component is large, it can be determined that misfiring occurs in two cylinders separated by three cylinders in the firing order (above ⑥).

(4) When both the amplitude of the half synchronous frequency component and the synchronous frequency component are large, it can be determined that misfiring occurs in one cylinder, or two adjacent cylinders in the firing order or separated by two cylinders in the firing order (above ②, ③, ⑤).

Figure 6A:
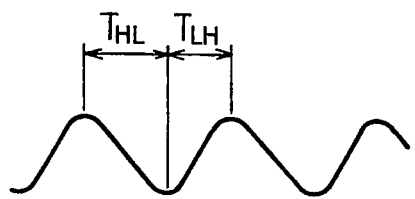
FIGS. 6A through 6C schematically show the change in the waveform of the half synchronous frequency component of the output signal of the torque sensor according to the misfiring mode of the engine.
Figure 6B:
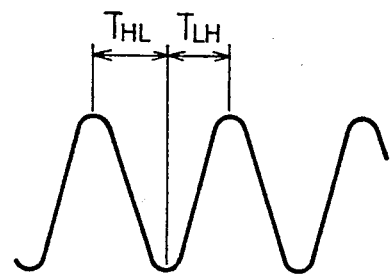
Figure 6C:
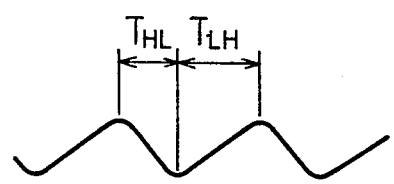

In this case, misfiring modes ②, ③ and ⑤ can be discriminated based on the waveform of the half synchronous frequency component. FIGS. 6A through 6C schematically show the change in the waveform of the half synchronous frequency component of the output signal of the torque sensor 53 according to the misfiring mode of the engine.

FIG. 6A shows the misfiring mode ② (misfiring in one cylinder), FIG. 6B shows the misfiring mode ③ (misfiring in two adjacent cylinders in the firing order), and FIG. 6C shows the misfiring mode ⑤ (misfiring in two cylinders separated by two cylinders in the firing order).

In FIGS. 6A through 6C, $T_{HL}$ designates the time from the maximum value (peak) of the waveform to the succeeding minimum value (bottom) of the waveform, and $T_{LH}$ designates the time from the minimum value of the waveform to the succeeding maximum value of the wave form. As seen from FIGS. 6A through 6C;
   a) when misfiring occurs in one cylinder (mode ②), $T_{HL}$ becomes larger than $T_{LH}$ ($T_{HL} > T_{LH}$),
   b) when misfiring occurs in two adjacent cylinders in firing order (③), $T_{HL}$ is substantially the same as $T_{LH}$ ($T_{HL} \approx T_{LH}$),
   c) when misfiring occurs in two cylinders separated by two cylinders in the firing order (⑤), $T_{HL}$ becomes smaller than $T_{LH}$ ($T_{HL} < T_{LH}$).

Accordingly, the misfiring modes ②, ③ and ⑤ can be discriminated by comparing $T_{HL}$ with $T_{LH}$ of the waveform of the half synchronous frequency component.

After the misfiring mode of the engine is determined, then the misfiring cylinders (cylinder numbers) can be determined based on the phase angle of the frequency components of the output signal of the torque sensor 53.

The phase angle of the frequency components relative to a reference crank angle changes according to the misfiring cylinders. FIGS. 7A to 7H illustrate the change in the phase angle of the half synchronous frequency component relative to a reference crank angle according to the change in the misfiring cylinder when misfiring occurs in one cylinder of the engine (mode ② above). In this embodiment, since a four cycle engine is employed, the output signal of the crank angle sensor 54 which is generated at every 720° crank angle (i.e., every two turns of the crankshaft) is used as the reference crank angle signal. FIGS. 7A to 7H show the phase of the half synchronous component when the misfiring cylinder is #1, #8, #4, #3, #6, #5, #7, #2, in this order (in the order same as the firing order) respectively.

As seen from FIGS. 7A through 7H, the phase of the waveform of the half synchronous component delays by approximately 45° CA when the position of the misfiring cylinder in the firing order delays by one cylinder. Accordingly, when it is determined that misfiring occurs in one cylinder of the engine, the misfiring cylinder is discriminated by detecting the phase angle of the half synchronous frequency component relative to the reference crank angle signal.

When misfiring occurs in two cylinders of the engine, the misfiring cylinders can be also discriminated by detecting the phase angle in the similar manner as explained above. FIGS. 8A through 8H, 9A, through 9H, and 10A through 10H illustrate the change in the phase angle of the waveforms of the half synchronous component when misfiring occurs in two cylinders of the engine. FIGS. 8A through 8B show the case in which misfiring occurs in two adjacent cylinders in the firing order (mode ③), and FIGS. 9A through 9H and 10A through 10H show the cases in which misfiring occurs in two cylinders separated by one cylinder. (mode ④), and two cylinders (mode ⑤) in the firing order respectively. Similarly to FIGS. 7A through 7H, also in these cases, the phase angle relative to the reference crank angle signal changes in accordance with the combination of the misfiring cylinders. Accordingly, the misfiring cylinders also can be discriminated based on the misfiring mode and the phase angle of the half synchronous frequency component of the output signal of the torque sensor 53.

When misfiring occurs in two cylinders separated by three cylinders in the firing order (mode ⑥), the misfiring cylinders cannot be determined by the phase of the half synchronous frequency component, since the half synchronous frequency component, substantially does not exist in this case. However, even in this case, the misfiring cylinders can be determined by detecting the phase angle of the synchronous frequency components of the output signal of the torque sensor 53, instead of the half synchronous frequency component.

FIGS. 11A through 11D illustrate the change in the phase angle of the synchronous frequency component relative to the reference crank angle signal when misfiring occurs in two cylinders separated by three cylinders in the firing order. As seen from FIGS. 11A through 11D, the respective combination of the misfiring cylinders shown the phase angle different by approximately 90° CA. Therefore, if it is determined that misfiring occurs in two cylinders separated by three cylinders in the firing order (mode ⑥), the misfiring cylinders can be determined by detecting the phase angle of the waveform of the synchronous frequency component.

Figure 12B:
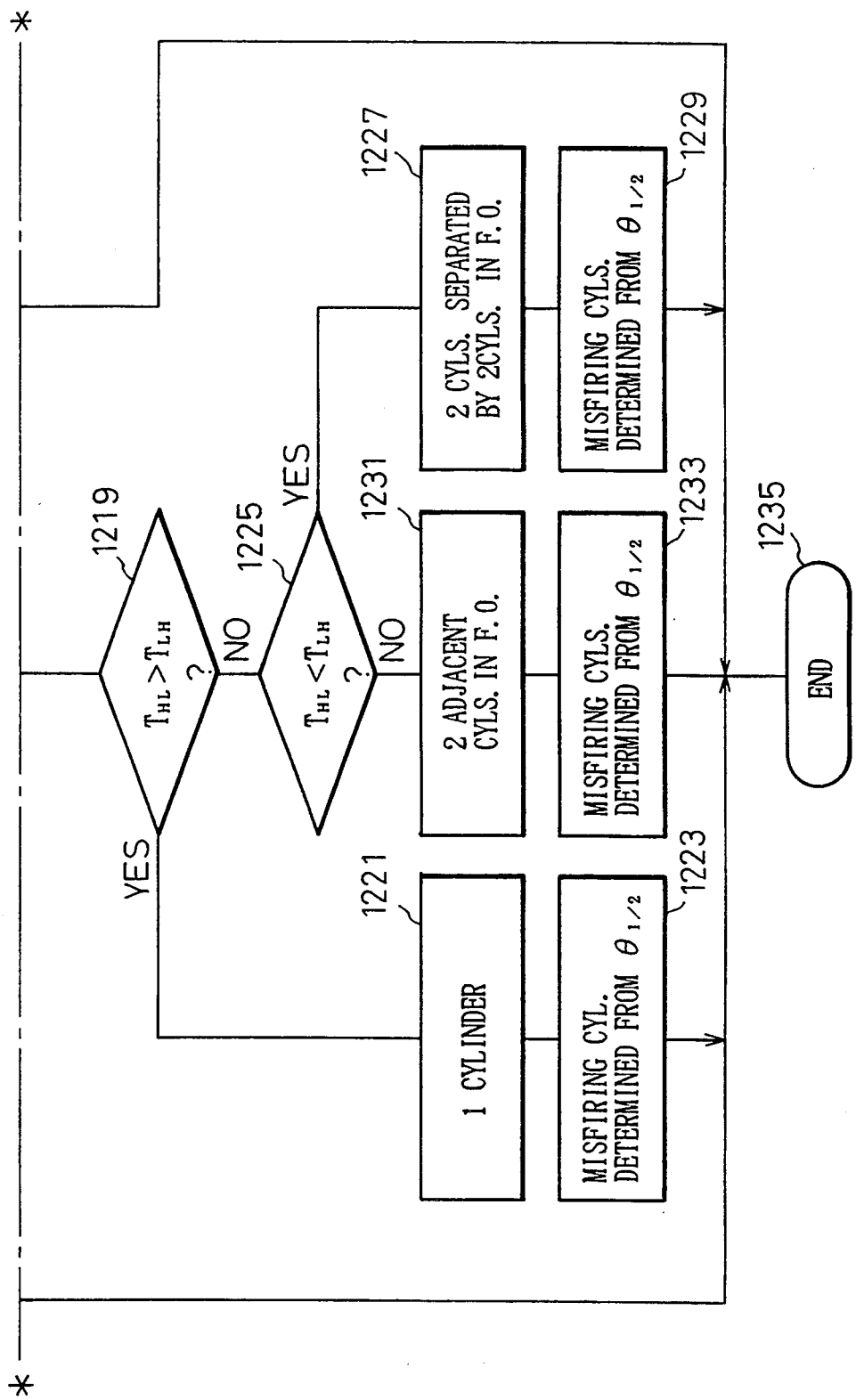

FIGS. 12A and 12B show a flow chart of the routine for determining the misfiring cylinders, which is executed by the ECU 30 in FIG. 1 at predetermined intervals.

When the routine starts, at step 1201 in FIG. 12A, the amplitude $L_1$, $L_{\frac{1}{2}}$ of the half synchronous and the synchronous frequency components of the output signal of the torque sensor 53, the phase angles $\theta_{\frac{1}{2}}$ and $\theta_1$ relative to the reference crank angle signal thereof, and the time $T_{HL}$, $T_{LH}$ of the waveform of the half synchronous component are fetched from the RAM 33. The values $L_1$, $L_{\frac{1}{2}}$, $\theta_{\frac{1}{2}}$, $\theta_1$ and $T_{LH}$ are detected from the waveform of the half synchronous and the synchronous frequency components of the output signal of the torque sensor 53 input from the adaptive filter 40 by an interrupt routine (not shown) executed by ECU 30 periodically, and stored in the RAM 33. Therefore, the value $L_1$, $L_{178}$, $\theta_{\frac{1}{2}}$, $\theta_1$ and $T_{HL}$, $T_{LH}$ stored in the RAM 33 are updated periodically, and the latest values thereof are always available.

Then, at step 1203 the magnitude of the amplitude $L_{\frac{1}{2}}$ is compared with a predetermined value A. A is a constant which is slightly larger than the amplitude of the half synchronous component when the misfiring occurs in two cylinders separated by three cylinders in the firing order (mode ⑥). If $L_{\frac{1}{2}}$ is smaller than or equals to A, since this means that either no misfiring occurs (mode ①) in the engine, or misfiring occurs in two cylinders separated by three cylinders in the firing order (mode ⑥), the routine proceeds to step 1205, which determines whether or not the amplitude $L_1$ of the synchronous frequency component is larger than a predetermined value B. B is a constant which is slightly larger than the amplitude of the synchronous frequency component when no misfiring occurs in the engine. When $L_1 \leq B$ at step 1205, it is determined that no misfiring occurs in the engine at step 1207, and the routine is terminated at step 1235 in FIG. 12B.

If $L_1 > B$ at step 1205, it is determined that misfiring occurs in two cylinders separated by three cylinders in the firing order (mode ⑥) at step 1209, and the routine proceeds to step 1211 at which the misfiring cylinders are determined by the phase angle $\theta_1$ of the waveform of the synchronous frequency component based on the relationships shown in FIGS. 11A through 11D.

On the other hand, if $L_{\frac{1}{2}} > A$ at step 1203, the routine proceeds to step 1213, which determines whether or not the amplitude $L_1$ of the synchronous frequency component is larger than a predetermined value B.

Then, if $L_1 \leq B$ at step 1213, it is determined that misfiring occurs in two cylinders separated by one cylinder in the firing order (mode ④) at step 1215, and the routine proceeds to step 1217 at which the misfiring cylinders are determined by the phase angle $\theta_{\frac{1}{2}}$ of the waveform of the half synchronous frequency component based on the relationships shown in FIGS. 9A through 9H.

Further, if $L_1 > B$ at step 1213, the routine proceeds to step 1219 which compares the values of $T_{HL}$ and $T_{LH}$.

If $T_{HL} > T_{LH}$ at step 1219, it is determined that misfiring occurs in one cylinder of the engine (mode ②) at step 1221, and the misfiring cylinder is determined at step 1223 by the phase angle $\theta_{\frac{1}{2}}$ of the waveform of the half synchronous frequency component based on the relationships shown in FIGS. 7A through 7H.

If it is determined that $T_{HL}$ is not larger than $T_{LH}$ at step 1219, it is determined whether or not $T_{HL}$ is smaller than $T_{LH}$ at step 1325. If $T_{HL} < T_{LH}$ at step 1325, it is determined that misfiring occurs in two cylinders separated by two cylinders in the firing order (mode ⑤) at step 1227, and the misfiring cylinders are determined at step 1229 by the phase angle $\theta_{\frac{1}{2}}$ of the waveform of the half synchronous frequency component based on the relationships shown in FIGS. 10A through 10H.

If $T_{HL}$ is not larger than $T_{LH}$ at step 1219, and $T_{HL}$ is not smaller than $T_{LH}$ at step 1225, since this means $T_{HL} = T_{LH}$, it is determined that misfiring occurs in two adjacent cylinders in the firing order (mode ③) at step 1231, and the routine proceeds to step 1233 at which the misfiring cylinders are determined by the phase angle $\theta_{\frac{1}{2}}$ of the waveform of the half synchronous frequency component based on the relationships shown in FIGS. 8A through 8H.

After completing the steps above, cylinder numbers of the misfiring cylinders are indicated on the misfiring indicator 55 by another routine (not shown) executed by the ECU 30 periodically.

Thus the misfiring cylinders are determined accurately by the frequency components of the output signal of the torque sensor 53.

Another embodiment of the procedure for determining the misfiring cylinders is now explained.

In the embodiment explained above, both the number of cylinders misfiring and the interval thereof in the firing order are determined from the amplitude and the waveforms of the half synchronous and the synchronous frequency components.

However, the number of the misfiring cylinders also can be determined from the average output torque of the engine. When misfiring occurs, the output torque of the engine decreases according to the number of the misfiring cylinders. For example, the average value of the output torque detected by the torque sensor 53 becomes approximately 88% of the output torque in the normal condition when one cylinder of the engine is misfiring, and becomes approximately 75% of the output torque in the normal condition when two cylinders of the engine are misfiring.

In the embodiment explained hereinafter, the output torque when the engine is operated in the normal condition (normal torque) is calculated from the operating parameters of the engine such as the boost pressure of the engine, the speed of the engine, etc., and the number of the misfiring cylinders are determined by comparing the average value of the output torque detected by the torque sensor 53 with the calculated normal torque.

If it is determined by the above procedure that two cylinders of the engine are misfiring, the interval thereof in the firing order can be determined by comparing the magnitudes of the amplitude $L_{\frac{1}{2}}$ of the half synchronous frequency component and the amplitude $L_1$ of the synchronous frequency component of the output signal of the torque sensor 53.

The relationship between the magnitudes of $L_{\frac{1}{2}}$ and $L_1$ changes according to the interval of the misfiring cylinders in the firing order when misfiring occurs in two cylinders of the engine as shown in FIGS. 4A through 4D.

Namely, when misfiring occurs in two adjacent cylinders in the firing order (mode ③), $L_{\frac{1}{2}}$ becomes substantially the same as $L_1$ (i.e., $L_{\frac{1}{2}} \approx L_1$);

when misfiring occurs in two cylinders separated by one cylinders in the firing order (mode ④), $L_{\frac{1}{2}}$ becomes larger than $L_1$ (i.e., $L_{\frac{1}{2}} > L_1$);

when misfiring occurs in two cylinders separated by two cylinders in the firing order (mode ⑤), $L_{\frac{1}{2}}$ becomes smaller than $L_1$ (i.e., $L_{\frac{1}{2}} < L_1$); and when misfiring occurs in two cylinders separated by three cylinders in the firing order (mode ⑥), $L_{\frac{1}{2}}$ becomes very small (i.e., $L_{\frac{1}{2}} \approx 0$).

Accordingly, the interval of the misfiring cylinders can be determined accurately by comparing the magnitudes Of $L_{\frac{1}{2}}$ and $L_1$.

When the mode of the misfiring, i.e., the number of the misfiring cylinders and the interval thereof in the firing order are determined, the misfiring cylinders can be determined from the phase angle $\theta_{\frac{1}{2}}$ and $\theta_1$ of the waveform of the half synchronous and the synchronous frequency components in the same manner as the embodiment explained before.

Figure 13B:
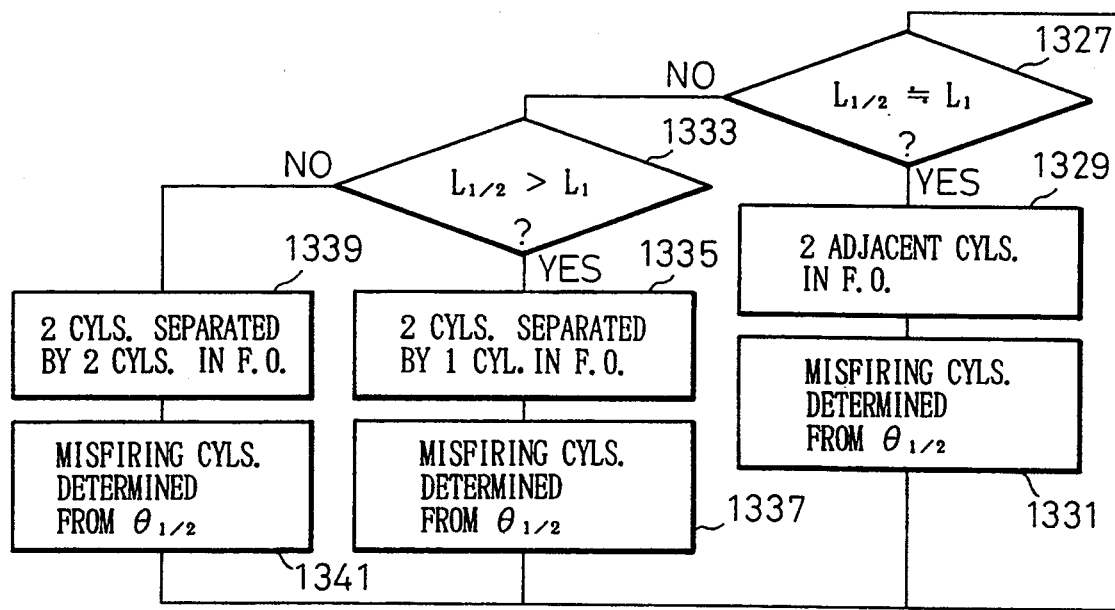

FIGS. 13A and 13B show a flow chart of the routine for determining the misfiring cylinders according to the procedure explained above. This routine is executed by the ECU 30 in FIG. 1 at predetermined intervals.

When the routine starts, at step 1301 in FIG. 13A, the boost pressure $P_B$ of the engine and the engine speed N are fetched from the RAM 33. The boost pressure $P_B$ is input from the boost pressure sensor 51, and the engine speed N is calculated from the output pulse signal of the crank angle sensor 52 by respective interrupt routine (not shown) executed by ECU 30 periodically, and the latest values thereof are always stored in the RAM 33.

Then, at step 1303, the normal torque $T_{NOR}$ of the engine is calculated. The value of $T_{NOR}$ is stored in the ROM 32 as the functions of the parameters $P_B$ and N, and at step 1303, $T_{NOR}$ is calculated based on the values $P_B$ and N fetched at step 1301.

Then, at step 1305, the average value $T_{AV}$ of the output torque of the engine is fetched from the RAM 33. The value $T_{AV}$ is calculated from the output signal of the torque sensor 53 by an interrupt routine (not shown) executed by ECU 30 periodically, and the latest values thereof is always stored in the RAM 33.

Also, at step 1307, the amplitude $L_{\frac{1}{2}}$, $L_1$, and the phase angle $\theta_{\frac{1}{2}}$, $\theta_1$ are fetched from the RAM 33. The values of $L_{\frac{1}{2}}$, $L_1$, and $\theta_{\frac{1}{2}}$, $\theta_1$ stored in the RAM 33 are updated periodically in the similar manner as the embodiment in FIG. 12A and 12B.

At step 1309, then the ratio $T_{AV}/T_{NOR}$ is calculated and it is determined whether or not the ratio $T_{AV}/T_{NOR}$ is smaller than a predetermined value $T_2$. $T_2$ is a constant slightly larger than the ratio $T_{AV}/T_{NOR}$ when two cylinders of the engine are misfiring. In this embodiment, the value of $T_2$ is determined by experiment on the actual engine.

If $T_{AV}/T_{NOR}$ is not smaller than $T_2$, then the routine proceeds to step 1311 which determines whether or not the ratio $T_{AV}/T_{NOR}$ is smaller than a predetermined value $T_1$. $T_1$ is a constant slightly larger than the ratio $T_{AV}/T_{NOR}$ when one cylinder of the engine is misfiring, and determined by experiment.

If the ratio $T_{AV}/T_{NOR}$ is not smaller than both $T_2$ and $T_1$, it is determined that the engine is operated in the normal condition (i.e., no misfiring occurs) at step 1313, and the routine is terminated at step 1345.

If the ratio $T_{AV}/T_{NOR}$ is smaller than $T_1$ at step 1311, since the ratio $T_{AV}/T_{NOR}$ is between $T_1$ and $T_2$, it is determined at step 1315 that misfiring occurs in one cylinder of the engine, and the misfiring cylinder is determined from the phase angle $\theta_{\frac{1}{2}}$ at step 1317 in the similar manner as step 1223 in FIG. 12B.

On the other hand, if the ratio $T_{AV}/T_{NOR}$ is smaller than $T_2$ at step 1309, it is determined that misfiring occurs in two cylinders in the engine, and the interval of the misfiring cylinders is determined by steps 1321, 1327 and 1333.

Namely, at step 1321, it is determined whether or not the amplitude $L_{\frac{1}{2}}$ of the half synchronous component is larger than a predetermined value C. C is a constant slightly larger than the amplitude $L_{\frac{1}{2}}$ when misfiring occurs in two cylinders separated by three cylinders in the firing order (i.e., $C \approx 0$). If $L_{\frac{1}{2}}$ is not larger than C at step 1321, it is determined that misfiring occurs in two cylinders separated by three cylinders in the firing order (step 1323), then the misfiring cylinders are determined from the phase angle $\theta_1$ at step 1325 in the similar manner as step 1211 in FIG. 12.

If $L_{\frac{1}{2}}$ is larger than C at step 1321, then the magnitudes of $L_{\frac{1}{2}}$ and $L_1$ are compared at steps 1327 and 1333. If $L_{\frac{1}{2}} \approx L_1$ at step 1327, this means that misfiring occurs in two adjacent cylinders in the firing order (step 1329), and the misfiring cylinders are determined from $\theta_{\frac{1}{2}}$ at step 1331 in the similar manner as step 1233 in FIG. 12. If $L_{\frac{1}{2}} > L_1$ at step 1333, this means that misfiring occurs in two cylinders separated by one cylinder in the firing order (step 1335), and the misfiring cylinders are determined from $\theta_{\frac{1}{2}}$ at step 1337 in the similar manner as step 1217 in FIG. 12. If $L_{\frac{1}{2}}$ is not larger than L1 a step 1333, i.e., $L_{\frac{1}{2}} < L_1$, then it is determined that misfiring occurs in two cylinders separated by two cylinders in the firing order (step 1339), and the misfiring cylinders are determined from $\theta_{\frac{1}{2}}$ at step 1341 in the similar manner as step 1229 in FIG. 12.

We claim:

1. A device for determining misfiring of cylinders in a multi-cylinder engine, comprising:
    a torque sensing means for detecting an output torque of the engine and generating an output signal representing the output torque of the engine;
    a frequency analyzing means for extracting specific frequency components from said output signal of said torque sensing means;
    a misfiring mode determining means for determining a mode of the misfiring of the engine characterized by number of the misfiring cylinders and the intervals thereof in the firing order based on at least the amplitude of said specific frequency components of said output signal of said torque sensing means; and
    a misfiring cylinder determining means for determining the misfiring cylinders based on said misfiring mode and said specific frequency components of the output signal of said torque sensing means.

2. A device according to claim 1, wherein said misfiring mode determining means comprises:
    a means for determining the number of the misfiring cylinders and the intervals thereof in the firing order based on the amplitude of said specific frequency components of said output signal of said torque sensing means and a waveform of one of said specific frequency components of the output signal of said torque sensing means.

3. A device according to claim 2, wherein said misfiring cylinder determining means comprises:
    a reference signal means for generating a reference crank angle signal every time the crankshaft of the engine turns a predetermined rotating angle;
    a phase difference detecting means for detecting the difference of the phases between said reference crank angle signal and the waveform of one of said specific frequency components of said output signal of said torque sensing means; and
    a determining means for determining the misfiring cylinders based on said misfiring mode of the engine determined by said misfiring mode determining means and said difference of the phases detected by said phase difference detecting means.

4. A device according to claim 3, wherein said specific frequency components of said output signal of said torque sensing means comprise a component having a frequency equal to the number of the revolutions of the engine crankshaft and a component having a frequency equal to half of the number of the revolutions of the engine crankshaft per second.

5. A device according to claim 1, wherein said misfiring mode determining means comprises:
    a means for calculating a calculated output torque of the engine based on operating parameters of the engine;
    a means for calculating an average value of the output torque of the engine detected by said torque sensing means;
    a means for determining the number of the misfiring cylinders by comparing said calculated output torque and said average value of the output torque; and
    a means for determining the intervals of the misfiring cylinders in the firing order based on said number of the misfiring cylinders and the amplitude of said specific frequency components of the output signal of said torque sensing means.

6. A device according to claim 5, wherein said misfiring cylinder determining means comprises:
    a reference signal means for generating a reference crank angle signal every time a crankshaft of the engine turns a predetermined rotating angle;
    a phase difference detecting means for detecting the difference of the phases between said reference crank angle signal and a waveform of one of said specific frequency components of said output signal of said torque sensing means; and
    a determining means for determining the misfiring cylinders based on said misfiring mode of the engine determined by said misfiring mode determining means and said difference of the phases detected by said phase difference detecting means.

7. A device according to claim 6, wherein said specific frequency components of said output signal of said torque sensing means comprise a component having a frequency equal to the number of the revolutions of the engine crankshaft and a component having a frequency equal to half of the number of the revolutions of the engine crankshaft per second.

* * * * *